United States Patent
Kihara et al.

(10) Patent No.: US 8,646,851 B2
(45) Date of Patent: Feb. 11, 2014

(54) VEHICLE WHEEL

(75) Inventors: Yuji Kihara, Chigasaki (JP); Yoshinobu Sakashita, Yokohama (JP); Kei Takagi, Toyokawa (JP); Yuta Isomura, Ayase (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/228,490

(22) Filed: Sep. 9, 2011

(65) Prior Publication Data
US 2011/0316324 A1 Dec. 29, 2011

Related U.S. Application Data

(63) Continuation of application No. PCT/JP2010/054379, filed on Mar. 16, 2010.

(30) Foreign Application Priority Data

Mar. 17, 2009 (JP) .................................. 2009-063759
Mar. 15, 2010 (JP) .................................. 2010-057767

(51) Int. Cl.
*B60B 3/10* (2006.01)
(52) U.S. Cl.
USPC ................................ 301/64.101; 301/63.103
(58) Field of Classification Search
USPC ............. 301/63.101, 63.103, 63.104, 63.107, 301/64.107, 64.101
See application file for complete search history.

(56) References Cited

U.S. PATENT DOCUMENTS

| 6,655,748 | B2 * | 12/2003 | Coleman et al. | 301/64.101 |
| 7,059,685 | B2 * | 6/2006 | Kermelk et al. | 301/64.101 |
| 7,464,995 | B2 * | 12/2008 | Csapo et al. | 301/63.107 |
| 7,895,752 | B2 * | 3/2011 | Sano et al. | 29/894.325 |
| 7,984,551 | B2 * | 7/2011 | McCorry et al. | 29/894.323 |
| 2006/0071539 | A1 | 4/2006 | Sereno | |

FOREIGN PATENT DOCUMENTS

| EP | 1262333 | | 3/2005 |
| EP | 1790499 | A1 * | 5/2007 |
| JP | 3-005602 | | 1/1991 |
| JP | 11-254901 | | 9/1999 |
| JP | 2003-34101 | | 2/2003 |
| JP | 2004-243925 | | 9/2004 |

(Continued)

OTHER PUBLICATIONS

Machine Translation of JP 2004-322899A (retrieved Feb. 5, 2013).*

(Continued)

*Primary Examiner* — Kip T Kotter
(74) *Attorney, Agent, or Firm* — DLA Piper LLP (US)

(57) ABSTRACT

A vehicle wheel having a rim and a disk. A disk flange of the disk may have a non-contact portion non-contacting a radially inner surface of the rim, at a radially outer extension of a width center line of a spoke. As a result, the rigidity of a portion of the disk in the circumferential direction of the wheel where the spoke is provided may be decreased compared with a wheel (conventional) where such non-contact portion is not provided. A difference in rigidity of the disk in the circumferential direction of the wheel between a portion where the vent window is provided and a portion where the spoke is provided may be smaller than that in the case of the conventional wheel, whereby a durability of the wheel and a run-out accuracy of the wheel may be improved.

3 Claims, 11 Drawing Sheets

(56) References Cited

FOREIGN PATENT DOCUMENTS

| JP | 2004322899 A | * | 11/2004 |
| JP | 2005053338 A | * | 3/2005 |
| JP | 2007-191025 | | 8/2007 |

OTHER PUBLICATIONS

International Search Report issued in PCT/JP2010/054379 on Jun. 1, 2010.
International Preliminary Report on Patentability issued in PCT/JP2010/054379 on Jun. 30, 2011.
English Language Abstract of JP 11-254901 published on Sep. 21, 1999.
English Language Translation of JP 11-254901 published on Sep. 21, 1999.
English Language Abstract of JP 2004-243925 published on Sep. 2, 2004.
English Language Translation of JP 2004-243925 published on Sep. 2, 2004.
English Language Abstract of JP 2003-034101 published on Feb. 4, 2003.
English Language Translation of JP 2003-034101 published on Feb. 4, 2003.
English Language Abstract of JP 2007-191025 published on Aug. 2, 2007.
English Language Translation of JP 2007-191025 published on Aug. 2, 2007.
English Language Abstract of JP 3-005602 published on Jan. 11, 1991.
English Language Translation of claim 1 of JP 3-005602 published on Jan. 11, 1991.

* cited by examiner

VEHICLE WHEEL

This is a continuation of International Application Serial No. PCT/JP2010/054379, filed on Mar. 16, 2010, which claims priority from Japanese Patent Application No. Japanese 2009-063759 and Japanese 2010-057767, filed on Mar. 17, 2009 and Mar. 15, 2010, respectively, the disclosures of which are hereby incorporated by reference in their entirety.

The present technology relates to a vehicle wheel. In one aspect, a vehicle wheel is provided that includes a rim having a drop portion and a radially inner surface, a disk having a hub coupling portion. The vehicle wheel also has a plurality of spokes extending outwardly in a radial direction of the wheel from the hub coupling portion and a disk flange located at a radially outer end portion of the wheel and connecting radially outer end portions of the plurality of spokes along a circumferential direction of the wheel. The disk includes a vent window formed between each pair of adjacent spokes of the plurality of spokes, the drop portion and the disk flange being connected to each other. The hub coupling portion has an axially inner surface in an axial direction of the wheel and the axially inner surface of the hub coupling portion is positioned between an axially outer end and an axially inner end of the disk flange in the axial direction of the wheel. The spoke has a bottom wall portion extending in the circumferential direction of the wheel, a pair of side wall portions each rising in the axial direction of the wheel from each of circumferentially opposite ends of the bottom wall portion and a brim portion extending in the circumferential direction of the wheel from each of the pair of side wall portion. The disk flange has a non-contact portion non-contacting the radially inner surface of the rim, at a radially outer extension of a width center line of each of the plurality of spokes.

BRIEF DESCRIPTION OF DRAWINGS

Specific examples have been chosen for purposes of illustration and description, and are shown in the accompanying drawings, forming a part of the specification.

DETAILED DESCRIPTION OF EMBODIMENTS OF THE PRESENT TECHNOLOGY

Figure 14:
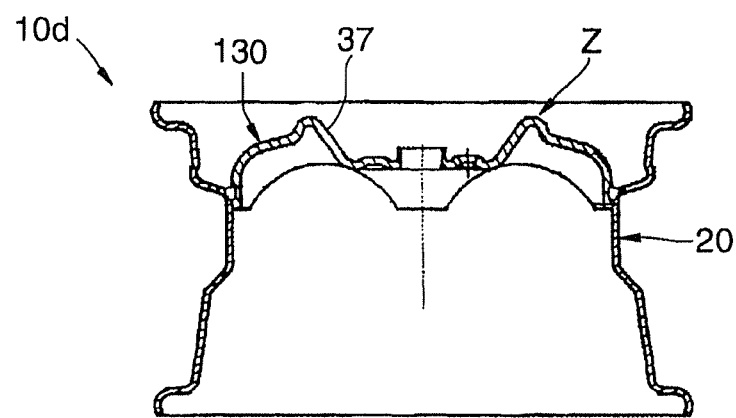
FIG. 14 is a cross-sectional view of a usual vehicle wheel which is different from the vehicle wheel of the present technology.
Figure 15:
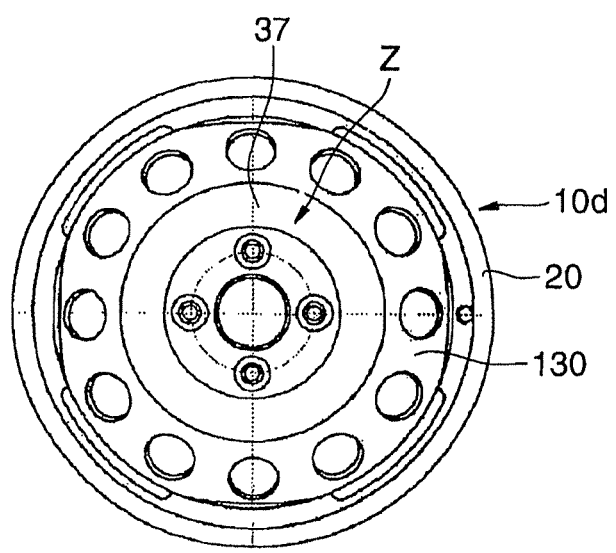
FIG. 15 is a front view of the usual vehicle wheel which is different from the vehicle wheel of the present technology.
Figure 16:
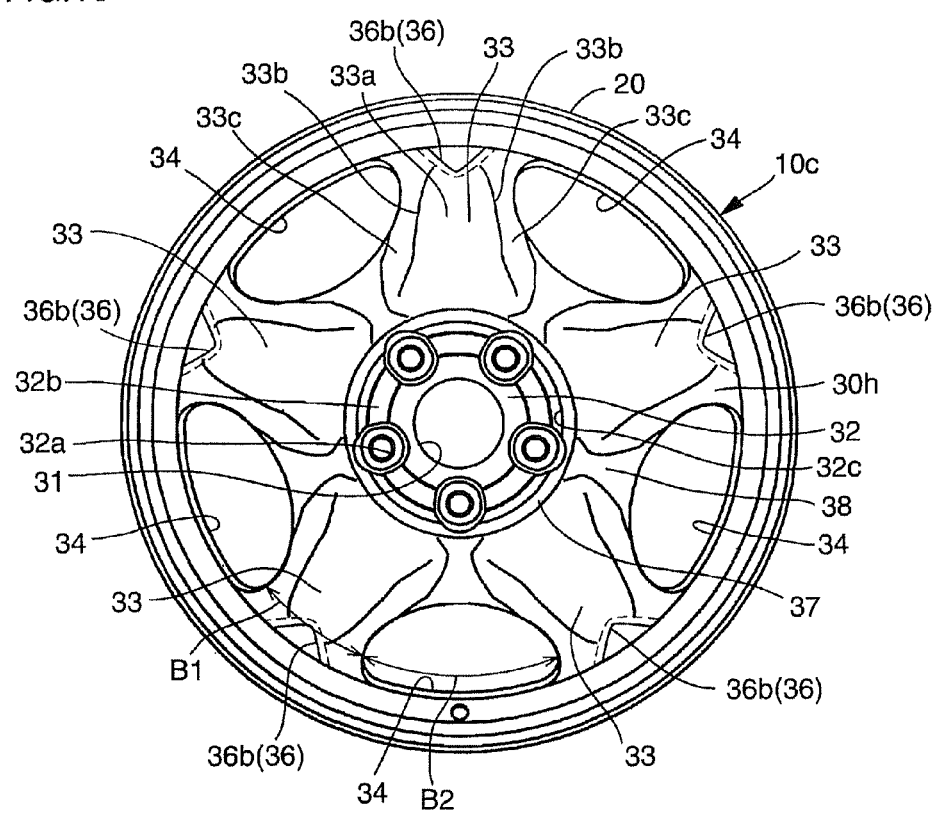
FIG. 16 is a front view of a vehicle wheel according to a second embodiment of the present technology.

FIGS. 1-13 illustrate a vehicle wheel according to a first embodiment of the present technology. FIGS. 14 and 15 illustrate a usual vehicle wheel different from the present technology. FIG. 16 illustrates a vehicle wheel according to a second embodiment of the present technology. FIGS. 8-11 are applicable to the second embodiment of the present technology.

Portions common to the first embodiment and the second embodiment of the present technology are denoted with the same reference numerals over the first embodiment and the second embodiment of the present technology.

First, portions common to the first embodiment and the second embodiment of the present technology will be explained.

Figure 1:
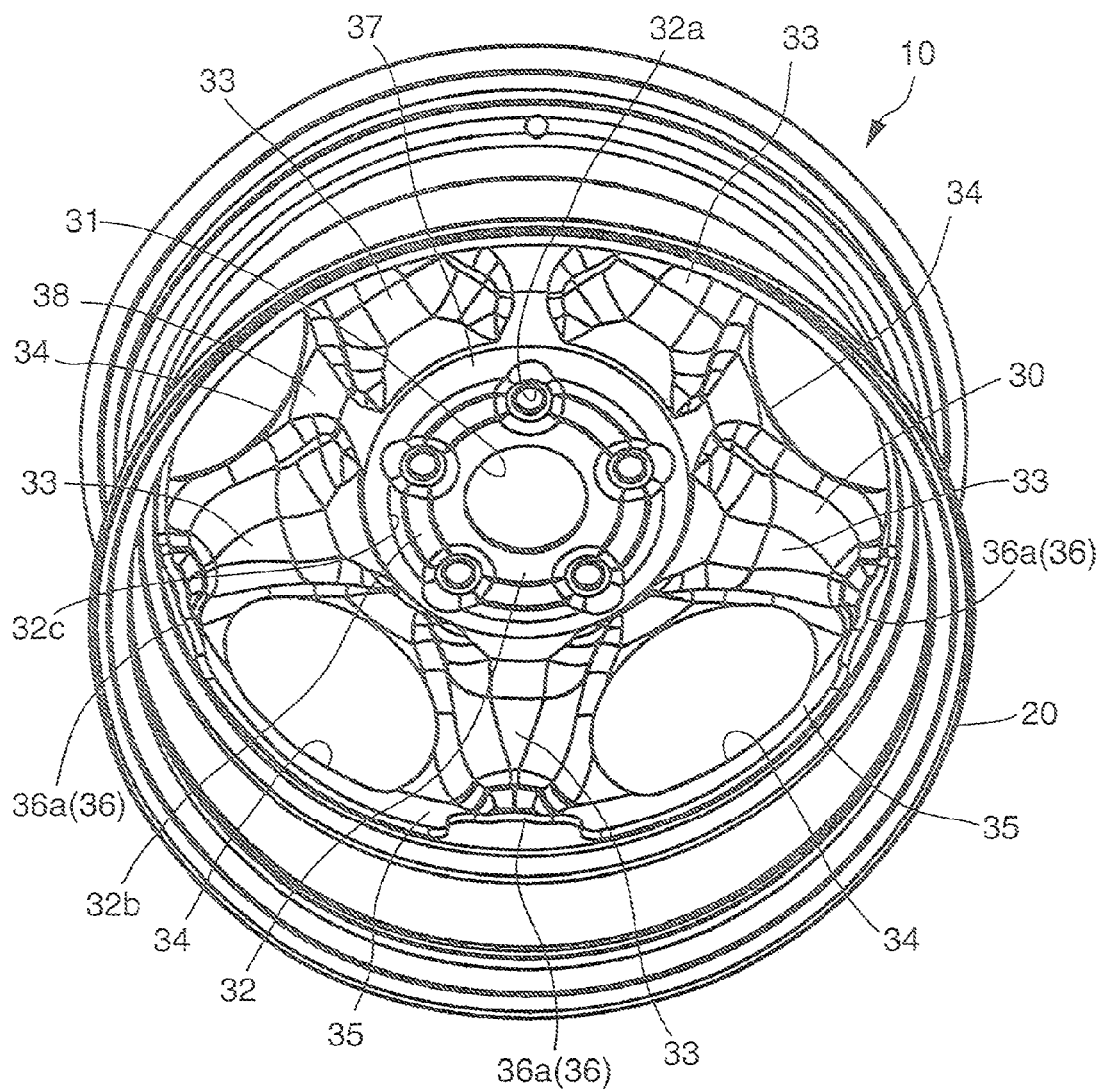
FIG. 1 is an oblique view of a vehicle wheel according to a first embodiments of the present technology when viewed from a rear side.

As illustrated in FIG. 1, a vehicle wheel (which may be referred to as a wheel, hereinafter) 10 according to embodiments of the present technology includes a rim 20 and a disk 30. The wheel 10 may be a two-piece wheel where the rim 20 and the disk 30 may be manufactured independently of each other and are integrated with each other by welding or using a connecting member such as rivets. The wheel 10 may be made from steel. So long as the wheel 10 is a two-piece wheel, the wheel 10 may be made from materials other than steel, and may be made from aluminum alloy or titanium alloy, etc.

Figure 3:
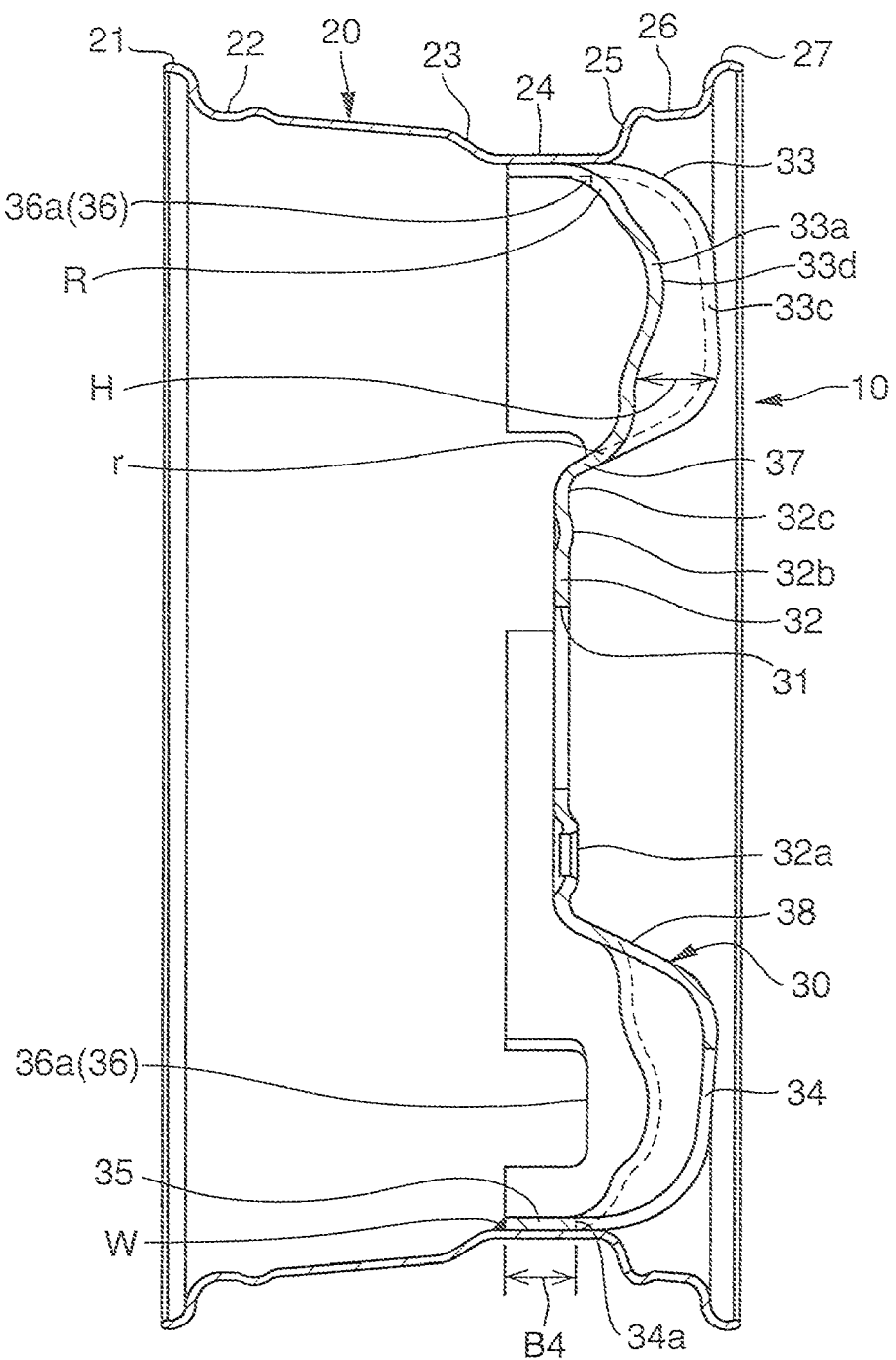
FIG. 3 is a cross-sectional view of the vehicle wheel according to the first embodiments of the present technology where a waved portion is provided at a bottom wall portion of the spoke.

As illustrated in FIG. 3, the rim 20 may include an inboard flange portion 21, an inboard bead seat portion 22, an inboard side wall portion 23, a drop portion 24, an outboard side wall portion 25, an outboard bead seat portion 26 and an outboard flange portion 27. The inboard flange portion 21, the inboard bead seat portion 22 and the inboard side wall portion 23 may be located closer to an inside of a vehicle than the outboard side wall portion 25, the outboard bead seat portion 26 and the outboard flange portion 27 in an axial direction of the wheel when the wheel 10 is mounted to the vehicle.

The disk 30 may be made from a plate. The disk 30 may include a hub hole 31, a hub coupling portion 32, a spoke 33, a vent window 34 and a disk flange 35. The disk 30 may include an inclined portion 37 and protrusion 38. The disk 30 does not have an annular protrusion Z which is continuous in a circumferential direction of the wheel and protrudes outwardly in the axial direction of the wheel, at a radially outer portion of the inclined portion 37, though the annular protrusion Z was provided in the conventional vehicle wheel disk 130 of wheel 10d as shown in FIGS. 14 and 15.

Figure 2:
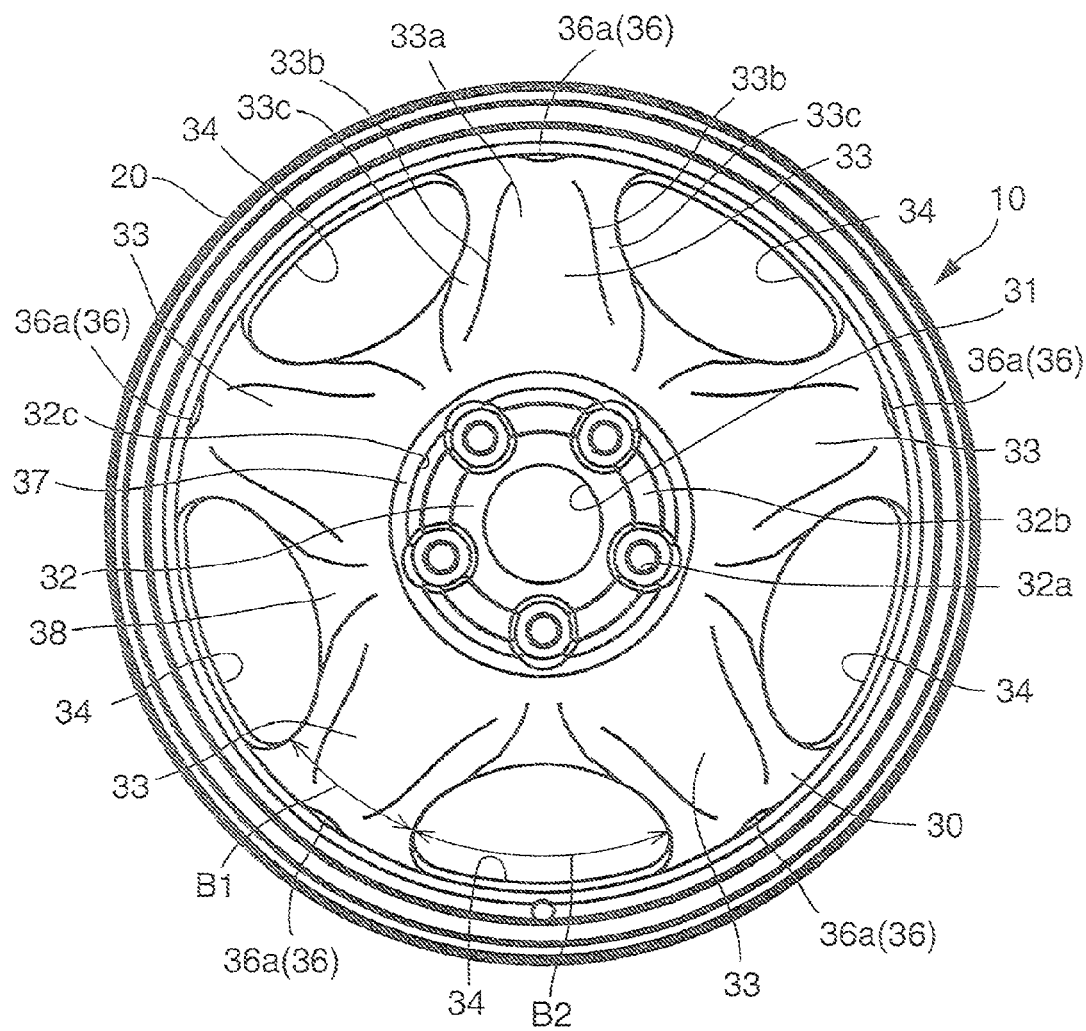
FIG. 2 is a front view of the vehicle wheel according to the first embodiments of the present technology where a spoke and a hub bolt hole is offset from each other in position in a circumferential direction of the wheel.

As illustrated in FIG. 2, the hub hole 31 is located at a radially central portion of the disk 30.

The hub coupling portion 32 surrounds the hub hole 31. The hub coupling portion 32 may be in the for of a flat plate or a substantially flat plate and may be perpendicular to a wheel axial direction. A plurality of hub bolt holes 32a are provided at the hub coupling portion 32. The hub bolt holes 32a may be equally spaced along a circumferential direction of the wheel. In one embodiment, five hub bolt holes 32a are provided. The number of the hub bolt holes 32a may vary in different embodiments of the present technology (e.g., three, four, six or more hub bolt holes). By passing hub bolts (not shown) extending from a hub (not shown) through the hub bolt holes 32a and coupling hub nuts (not shown) with the hub bolts, the disk 30 (the wheel 10) is fixed to the hub.

As illustrated in FIG. 2, in order to improve rigidity and durability of the hub coupling portion 32, a swell 32b may be provided at the hub coupling portion 32. The swell 32b may be provided around the hub bolt hole 32a and convexly swells axially outwardly to a small extent (e.g., about 0.3-5 mm). In the embodiment, the swell 32b may extend in an arc between the hub bolt holes 32a and may connect the hub bolt holes 32a. The swell 32b may take a shape other than the arc.

As illustrated in FIG. 3, an axially inner surface of the hub coupling portion 32 may be positioned between an axially outer end and an axially inner end of the disk flange 35 in the axial direction of the wheel.

Figure 12:
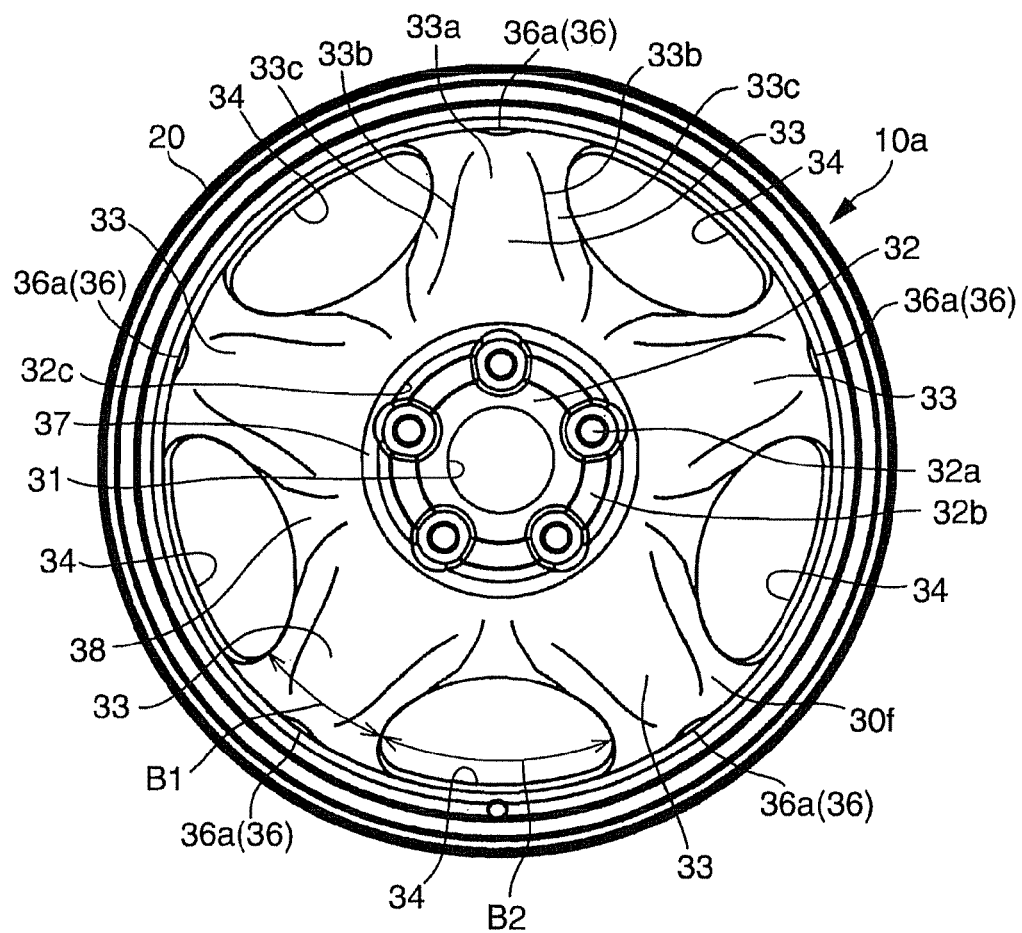
FIG. 12 is a front view of the vehicle wheel according to the first embodiment of the present technology where the spoke and the hub bolt hole coincide with each other in position in the circumferential direction of the wheel.

The hub bolt hole 32a may be located between adjacent spokes 33 along the circumferential direction of the wheel as shown in FIG. 2 or may be located at the same circumferential position as the spoke 33 as shown in vehicle wheel 10a of FIG. 12.

As illustrated in FIG. 3, the spoke 33 may extend radially outwardly from the hub coupling portion 32 via the inclined portion 37 to the disk flange 35. A plurality of spokes 33 may be provided. In one embodiment, five spokes 33 are provided. The number of the spokes 33 may vary in different embodiments of the present technology (e.g., three, four or six or more spokes). The number of the spokes 33 and the number of the hub bolt holes 32a may differ from each other.

Figure 13:
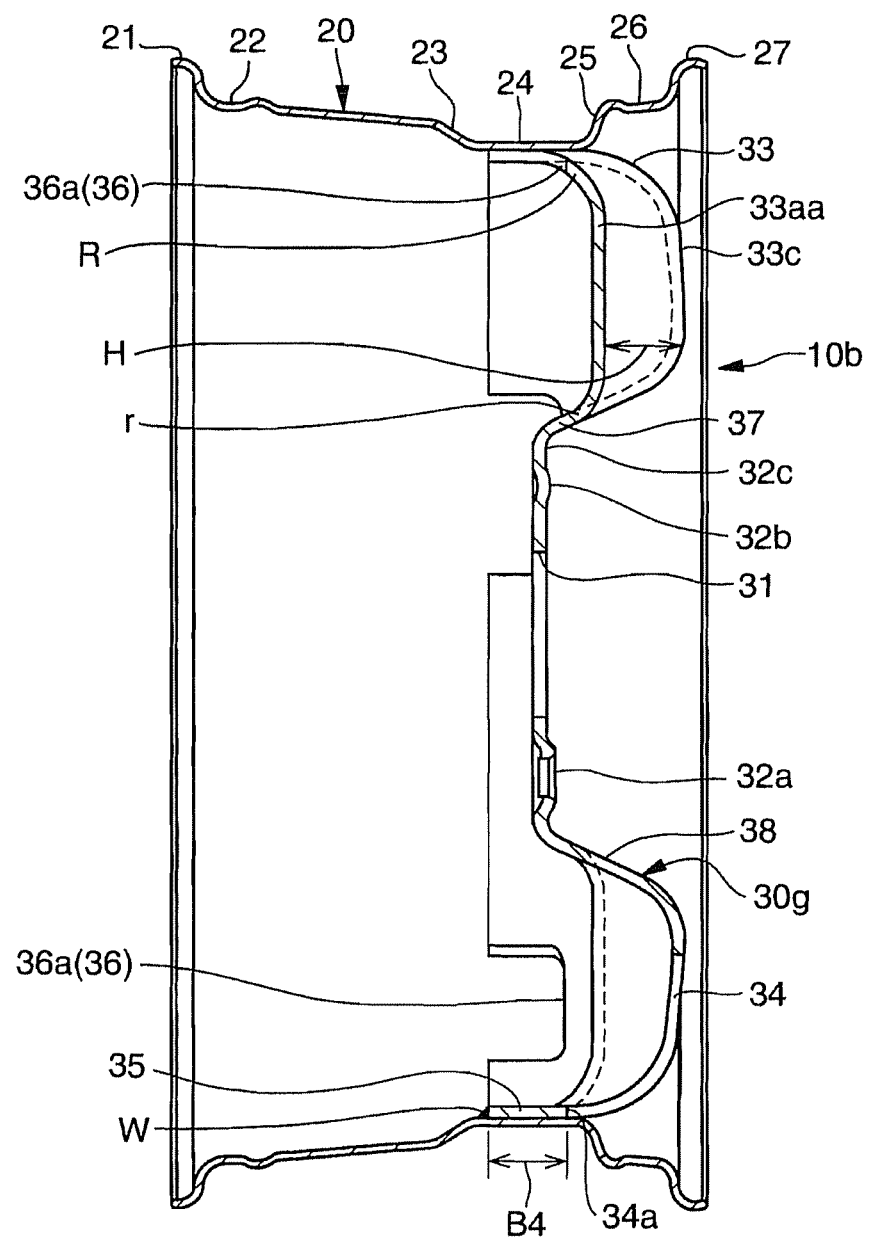
FIG. 13 is a cross-sectional view of the vehicle wheel according to the first embodiment of the present technology where a waved portion is not provided at the bottom wall portion of the spoke.

As illustrated in FIGS. 3 and 13 with respect to vehicle wheels 10 and 10b, respectively, a radially outer end portion of the spoke 33 may form a radially outer curved connecting portion R which is bent axially inwardly and is connected to the disk flange 35. A radially inner end portion of the spoke 33 may form a radially inner curved connecting portion r which is bent axially inwardly and is connected to the inclined portion 37. A radially intermediate portion of the spoke 33 (between the radially outer curved connecting portion R and the radially inner curved connecting portion r) may extend in a direction perpendicular or substantially perpendicular to the axial direction of the wheel. Radially opposite ends of the radially intermediate portion of the spoke 33 may be located at substantially equal axial positions in the wheel axial direction.

Since the radially intermediate portion of the spoke 33 may extend in the direction perpendicular to the axial direction of the wheel, when a transverse load acts on a tire (the rim 20) during running of a vehicle, a large bending moment can act on the spoke 33. In order to suppress a deformation of the spoke 33 due to the large bending moment and to increase a durability of the wheel, the spoke 33 may have a bottom wall portion 33a extending along the circumferential direction of the wheel (i.e., a width direction of the spoke), a pair of side wall portions 33b rising axially outwardly from opposite ends of the bottom wall portion 33a along the circumferential direction of the wheel (i.e., the width direction of the spoke 33), and a brim portion 33c extending in the circumferential direction of the wheel from a rising end of each of the pair of side wall portions 33b as shown in FIGS. 2-7 and 10-13.

The bottom wall portion 33a may extend radially outwardly from the inclined portion 37. The bottom wall portion 33a also may extend in the circumferential direction of the wheel (in the width direction of the spoke 33) in a cross section taken along a plane perpendicular to the radial direction of the wheel. A waved portion 33d may be provided in the bottom wall portion 33a as shown in FIG. 3. A waved portion may not be provided in the bottom wall portion 33aa as shown in FIG. 13.

Figure 10:
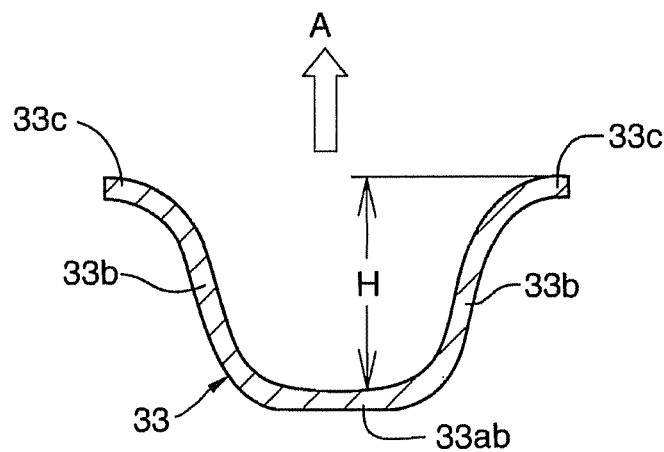
FIG. 10 is a cross-sectional view of the spoke of the vehicle wheel according to the first embodiments of the present technology where a side wall portion of the spoke rises from a bottom wall portion of the spoke outwardly in the axial direction of the wheel.
Figure 11:
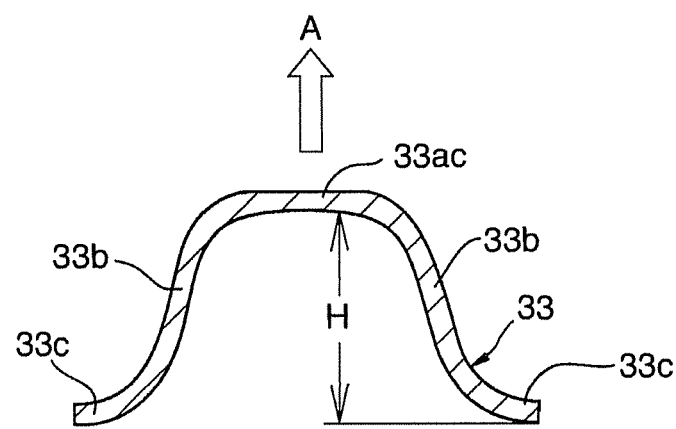
FIG. 11 is a cross-sectional view of the spoke of the vehicle wheel according to the first embodiment of the present technology where a side wall portion of the spoke rises from a bottom wall portion of the spoke inwardly in the axial direction of the wheel.

The side wall portion 33b may extend from the circumferentially opposite ends of the bottom wall portion 33a in a direction away from the bottom wall portion 33a and in the axial direction of the wheel. The side wall portion 33b may extend from the bottom wall portion 33ab axially outwardly in a cross section perpendicular to the radial direction of the wheel as illustrated in FIG. 10 or may extend from the bottom wall portion 33ac axially inwardly as illustrated in FIG. 11. In FIGS. 10 and 11, arrow "A" shows the axially outward direction of the wheel. In the embodiments of FIGS. 1-9, 12, 13 and 16, the side wall portion 33b may extend from the bottom wall portion 33a in the axially outward direction of the wheel.

The brim portion 33c may extend from an rising-side end of the side wall portion 33b opposite the bottom wall portion 33a in the circumferential direction of the wheel in a direction to enlarge a width of the spoke 33 (outwardly in a width direction of the spoke).

As illustrated in FIGS. 3 and 13, the spoke 33 may be located axially more outwardly than the hub coupling portion 32 and the disk flange 35. As a result, when the wheel 10 or 10b is subjected to a load (for example when mounted on a vehicle), a bending moment directed axially inwardly acts on a spoke 33 located on a ground side.

In a case where the side wall portion 33b extends outwardly in the axial direction of the wheel from the bottom wall portion 33a, a tension stress is caused at the brim portion 33e in the radial direction of the wheel and supports the load. This may ensure a rigidity of the disk. In a case where the side wall portion 33h extends inwardly in the axial direction of the wheel from the bottom wall portion 33a, a compression stress may be caused at the brim portion 33c in the radial direction of the wheel. As a result, a portion of the spoke 33 located at a boundary to the vent window 34 is not liable to be affected by small notches caused when punching the vent window, so that a durability of the wheel is improved.

An axial with H of the side wall portion 33b may be greatest at a vicinity of a radially inner end of the vent window 34 as illustrated in FIG. 3 in order that a rigidity of the wheel 10 is effectively increased. The maximum of the axial width H of the side wall portion 33b may be two to twenty times the thickness of the bottom wall portion 33a. In some embodiments of the present technology, the maximum of the axial width H of the side wall portion 33b is four to ten times the thickness of the bottom wall portion 33a. This may yield a high rigidity of the wheel 10 and a good formability of the disk 30.

As illustrated in FIG. 2, a width (in the circumferential direction of the wheel) B1 of a smallest width portion of the spoke 33 may be smaller than a width (in the circumferential direction of the wheel) B2 of a largest width portion of the vent window 34.

As illustrated in FIG. 2, the vent window 34 may be formed in the shape of an ellipse when viewed from an outside in the axial direction. The shape of the vent window 34 when viewed from an axial outside is not limited to an ellipse, and may be triangle, trapezoid, and another shape.

As illustrated in FIG. 2, the vent window 34 may be located between circumferentially adjacent spokes 33. The width of the spoke 33 along the circumferential direction of the wheel may be smallest at a portion corresponding to a portion of the vent windows 34 having a greatest interior length along the wheel circumferential direction.

The vent windows 34 may be equally spaced along the circumferential direction of the wheel and the same number of vent windows 34 as that of the spokes 33 may be provided. As shown in FIGS. 4-7, each vent window 34 is partially bounded by an axially outermost portion of the brim portion 33c of a respective spoke 33. As illustrated in FIGS. 3 and 13, a radially outer end portion 34a of the vent window 34 may define an axially innermost portion of the vent window 34. In FIGS. 3-7 and 13, the radially outer end portion 34a of the vent window 34 may reach the disk flange 35 and may be directly connected to the disk flange 35 which extends straight in the axial direction of the wheel in a cross section of the wheel. However, as illustrated in FIGS. 8 and 9, a tapered or stepped shift portion 35aa or 35ab may be provided between the vent window 34 and the disk flange 35 extending straight in the axial direction of the wheel.

Figure 8:
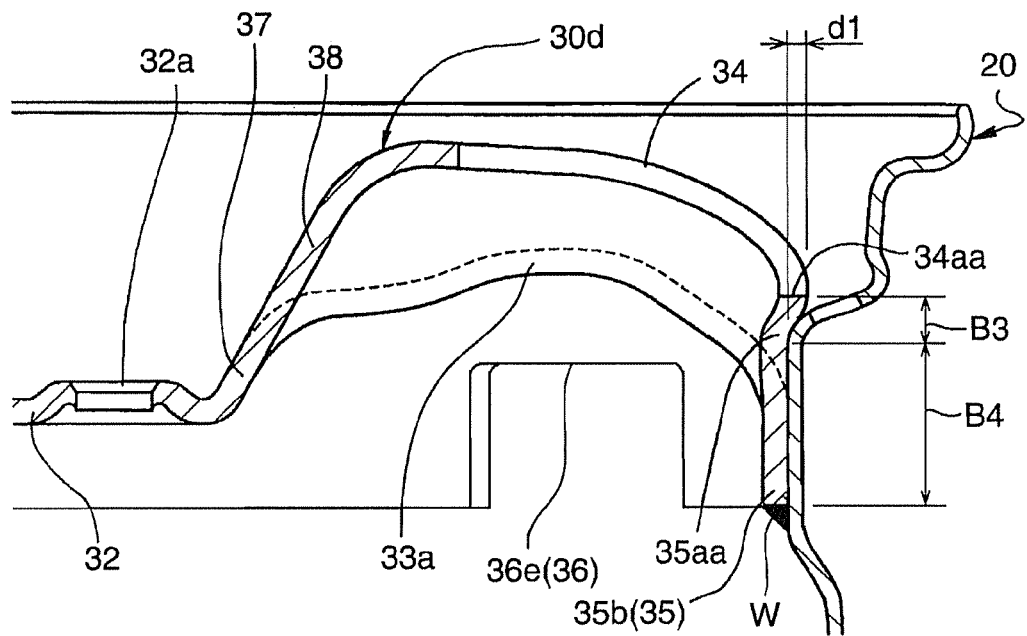
FIG. 8 is a cross-sectional view of a portion of the vehicle wheel according to the first embodiments of the present technology where a shift portion is provided between a vent window and a disk flange extending straight in an axial direction of the wheel in a side view of the wheel, and a vent window-side diameter of the shift portion is larger than a disk flange-side diameter of the shift portion.

In FIG. 8, a diameter of a portion of the shift portion 35aa closer to the vent window 34 may be larger than a diameter of a portion of the shift portion 35aa closer to the disk flange 35. A diameter of a radially outer end portion 34aa of the vent window 34 may be larger than a diameter of the disk flange 35, and the radially outer end portion 34aa of the vent window 34 may be located radially outside a radially outer surface of the disk flange 35. Preferably, a difference in radius (a step amount) d1 between the radially outer surface of the disk flange 35 and a radially outer surface of the shift portion 35aa may be smaller than a thickness of the disk flange 35 (e.g. 5 mm, more usually, 2.5 mm-8 mm). More preferably, the step amount d1 is 0.5 mm or larger and equal to or smaller than the thickness of the disk flange 35. When the step amount d1 is 0.5 mm or larger and equal to or smaller than the thickness of the disk flange 35, a rigidity of the disk flange 35 is high and the durability of the wheel 10 is high.

Further, positioning the wheel disk 30d relative to the rim 20 in the axial direction at the time of assembly of the wheel disk 30d and the rim 20 becomes easy due to the stepped shift portion 35aa. If the step amount d1 is smaller than 0.5 mm, the effect of the axial positioning becomes small. Though the step amount d1 may be larger than the thickness of the disk flange 35, it becomes difficult to press-form the wheel disk 30d.

Figure 9:
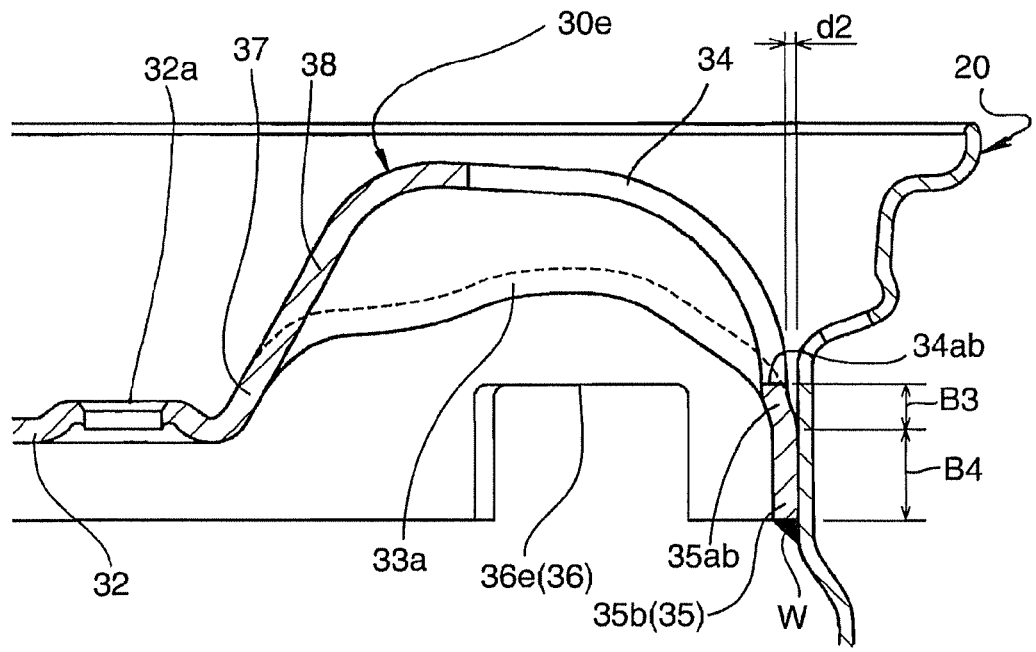
FIG. 9 is a cross-sectional view of a portion of the vehicle wheel according to the first embodiments of the present technology where a shift portion is provided between the vent window and the disk flange extending straight in an axial direction of the wheel in a side view of the wheel, and a vent window-side diameter of the shift portion is smaller than a disk flange-side diameter of the shift portion.

In FIG. 9, a diameter of a portion of the shift portion 35ab closer to the vent window 34 may be smaller than a diameter of a portion of the shift portion 35ab closer to the disk flange 35. A diameter of a radially outer end portion 34ab of the vent window 34 may be smaller than a diameter of the disk flange 35, and the radially outer end portion 34ab of the vent window 34 may be located radially inside the radially outer surface of the disk flange 35. Preferably, a difference in radius (a step amount) d2 between the radially outer surface of the disk flange 35 and a radially outer surface of the shift portion 35ab may be smaller than a thickness of the disk flange 35 (e.g. 5 mm, more usually, 2.5 mm-8 mm). More preferably, the step amount d2 is 0.5 mm or larger and equal to or smaller than the thickness of the disk flange 35. When the step amount d2 is 0.5 mm or larger and equal to or smaller than the thickness of the disk flange 35, a rigidity of the disk flange 35 is high and the durability of the wheel 10 is high. Further, since the diameter of the shift portion 35ab may be smaller than the diameter of the disk flange 35, fitting the wheel disk 30e into the rim 20 is easy when the rim 20 and the wheel disk 30e are assembled. If the step amount d2 is smaller than 0.5 mm, the easy fitting effect due to the stepped shift portion becomes small, because the fitting between the rim 20 and the wheel disk 30e is a tight fitting and the wheel disk 30e is deformed so as to decrease the step amount when the wheel disk 30e is fitted into the rim 20. Though the step amount d2 may be larger than the thickness of the disk flange 35, it becomes difficult to press-form the wheel disk 30e. Further, the vent window 34 becomes small so that a design of the wheel is degraded.

Figure 4:
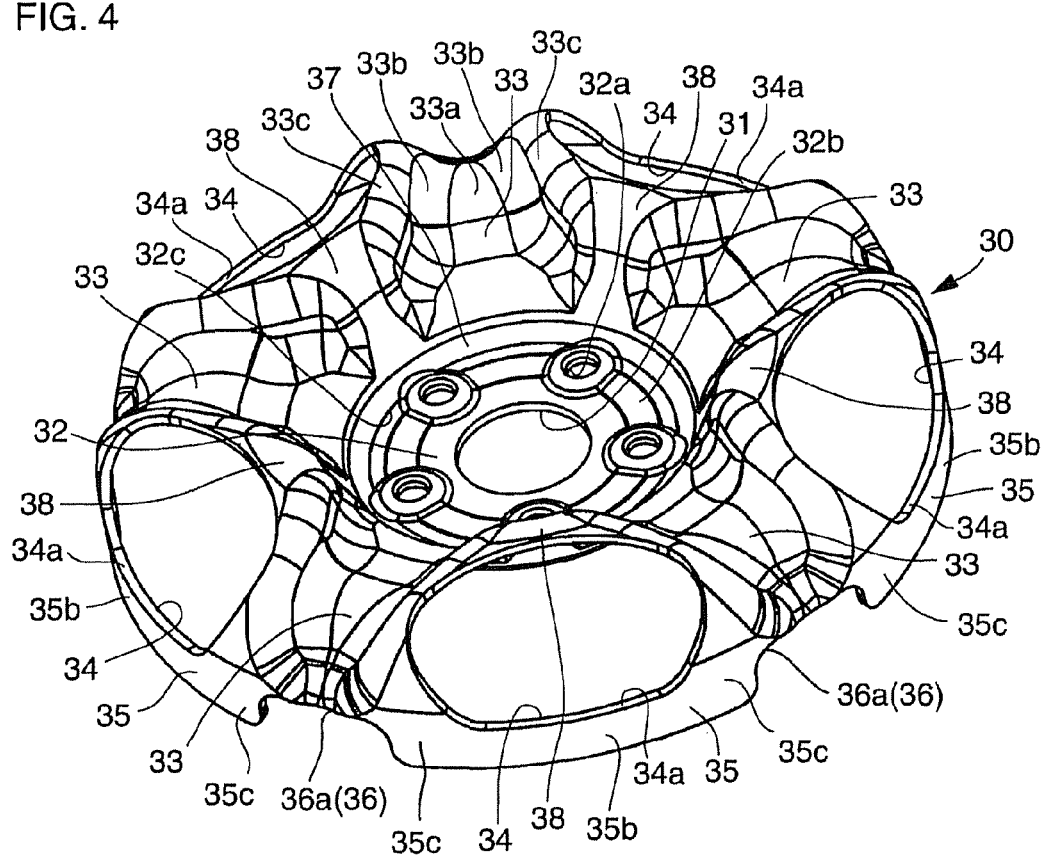
FIG. 4 is an oblique view of the vehicle wheel according to the first embodiments of the present technology where a non-contact portion is made from a substantially rectangular cut portion.

The disk flange 35 may be located at or near a radially outer end portion of the disk 30. In the embodiment of FIG. 8, the disk flange 35 may be located near the radially outer end portion of the disk 30d. As illustrated in FIG. 4, the disk flange 35 may connect the radially outer end portions or their vicinities of adjacent spokes 33 and 33 in the circumferential direction of the wheel. As illustrated in FIG. 3, the disk flange 35 may extend straight in the axial direction of the wheel in a cross section perpendicular to the circumferential direction of the wheel.

A sum width (B3+B4) of an axial width (a smallest portion) B3 of the shift portion 35a between the vent window 34 and the disk flange 35 and an axial width (a smallest portion) B4 of the disk flange 35 adjacent to the vent window 34 shown in FIGS. 8 and 9 may be smaller than a width B2 of a largest width portion of the vent window 34 in the circumferential direction of the wheel (shown in FIGS. 2, 12 and 16). Further, the sum width (B3+B4) of an axial width (a smallest portion) B3 of the shift portion 35a between the vent window 34 and the disk flange 35 and an axial width (a smallest portion) B4 of the disk flange 35 adjacent to the vent window 34 shown in FIGS. 3 and 9 may be smaller than a width B1 of a smallest width portion of the spoke 33 in the circumferential direction of the wheel (shown in FIGS. 2, 12 and 16).

In the case where the disk has no shift portion as shown in FIGS. 3 and 13, an axial width (a smallest portion) B4 of the disk flange 35 adjacent to the vent window 34 may be smaller than a width B2 of a largest width portion of the vent window 34 in the Circumferential direction of the wheel (shown in FIGS. 2, 12 and 16). The axial width (a smallest portion) B4 of the disk flange 35 adjacent to the vent window 34 may be smaller than the width B1 (the width in the circumferential direction of the wheel) of the smallest width portion of the spoke 33 (shown in FIGS. 2, 12 and 16).

As illustrated in FIG. 3, the disk flange 35 may be fit to the drop portion 24 of the rim 20 and may be connected (fixed, welded) to the drop portion 24. In some embodiments of the present technology, the disk flange 35 may alternatively be fit to the rim 20 at the inboard bead seat portion 22 or the outboard bead seat portion 26 and be connected.

The disk flange 35 may be fixed to the rim 20 at a first position 35b (shown in FIG. 4) only, where the first position is defined as a position located inward of the vent window 34 in the axial direction of the wheel. The disk flange 35 may alternatively be fixed to the rim 20 at a second position 35c (shown in FIG. 4) only, where the second, position is defined as a position other than the first position 35b and located on opposite sides of a non-contact portion 36 (which will be described later) in the circumferential direction of the wheel. Further, the disk flange 35 may be fixed to the rim 20 at both of the first position 35b and the second position 35c. Further, when the disk flange 35 is fixed to the rim 20 by welding, the weld W may be positioned at an axially inner end (shown in FIG. 3) of the first position 35b or the second position 35c, or at an axially outer end of the first position 35b or the second position 35c. Further, the weld W may be positioned both at the axially inner end and at the axially outer end of the first position 35b or the second position 35c.

When the disk flange 35 is fixed to the rim 20 at the first position 35b, stress concentration on the weld may be reduced, and a fatigue durability of the wheel 10 may be increased, because the disk flange 35 is welded to the rim 20 at the position of disk flange 35 having a low rigidity compared with a case where the disk flange 35 is welded to the rim 20 at the position of the disk flange 35 located radially outer end of the spoke 33.

When the disk flange 35 is fixed to the rim 20 at the second position 35c, welding may be surely conducted, because an axial position of the second position 35c after press-forming is stable, even if the vent window 34 is punched before the disk flange 35 is press-formed.

As illustrated in FIGS. 1 and 2, the disk flange 35 may have a non-contact portion 36 non-contacting the radially inner surface of the rim 20, at a radially outer extension of a width center line of the spoke 33. The non-contact portion 36 may be constructed from a cut portion 36a formed at the disk flange 35 and located at the radially outer extension of the width center line of the spoke 33 (the first embodiment of the present technology), or may be constructed from a concave portion 36b concave inwardly in the radial direction of the wheel and located at the radially outer extension of the width center line of the spoke 33 (the second embodiment of the present technology). The same number of the non-contact portions 36 as those of the spokes 33 may be provided.

The disk flange 35 may extend in the circumferential direction of the wheel except the non-contact portion 36. Due to the non-contact portion 36, the disk flange 35 may extend discontinuously in the circumferential direction of the wheel (i.e., is not in the form of a ring).

As illustrated in FIG. 4, the inclined portion 37 may be a portion located radially outside the hub coupling portion 32 and may be substantially cylindrical. The inclined portion 37 may connect the bottom wall portion 33a of the spoke 33 and the hub coupling portion 32. The inclined portion 37 may extend outwardly in the radial direction of the wheel and outwardly in the axial direction of the wheel from a radially outer portion 32c of the hub coupling portion 32.

The protrusion 38 may protrude outwardly in the axial direction of the wheel and inwardly in the radial direction of the wheel radially inside the vent window 34 and is connected to the inclined portion 37. Though the protrusion 38 may be connected directly to the hub coupling portion 32 beyond the inclined portion 37, in such a case, the position of the hub bolt hole 32a is fixed to a position where the hub bolt hole 32a radially opposes to the spoke 33.

Now, operation common to the first and second embodiments of the present technology will be explained.

In the embodiments of the present technology, since the disk flange 35 may have the non-contact portion 36 non-contacting the radially inner surface of the rim 20, at a radially outer extension of a width center line of the spoke 33, the rigidity to rigidity in a case where an entire portion of the disk flange 35 except an objected portion of the disk flange 35 bends a plate material of the objected portion of the disk flange 35 in a direction of a plate thickness of the plate material) of a portion of the disk 30 in the circumferential direction of the wheel where the spoke 33 is provided may be decreased compared with a wheel (conventional) having no non-contact portion 36. Therefore, a difference in rigidity of the disk 30 in the circumferential direction of the wheel between a first portion of the disk 30 where the vent window 34 is provided and a second portion of the disk 30 where the spoke 33 is provided may be made smaller than a difference in rigidity of the conventional wheel. Further, the fitting strength of the disk 30 between the disk flange 35 and the drop portion 24 of the rim 20 may be decreased at the position where the spoke 33 is provided, in the circumferential direction of the wheel. Therefore, a difference in fitting strength of the disk flange 35 with the drop portion 24 of the rim 20 between a first portion of the disk flange 35 where the vent window 34 is provided and a second portion of the disk flange 35 where the spoke 33 is provided may be made small. As a result, compared with the conventional wheel, a durability of the wheel may be increased and a ran-out accuracy of the wheel may be improved. Further, a load transmission from the spoke 33 to portions of the disk flange 35 corresponding to vent windows 34 located opposite the spoke 33 may be smooth and stress concentration at the portions of the disk flange may be decreased.

Since the vent window 34 may be enlarged and the spoke 33 may be constructed with the bottom wall portion, the side wall portions and the brim portion, the portion of the disk flange 35 where the radially outer portion of the spoke 33 is connected may be deformed to a convex and concave configuration when the disk flange 35 is drawing-formed by press-forming. Despite that, since the disk flange 35 may have the non-contact portion 36, a large force may not act on the fitting portion of the disk flange with the drop portion 24 of the rim 20. Further, since the drop portion 24 of the rim 20 may not contact a configuration of the portion of the disk flange 35 connected to the radially outer end of the spoke 33, the drop portion 24 of the rim 20 may not be affected by the convex and concave configuration of the portion of the disk flange 35 connected to the radially outer end of the spoke 33. As a result, a decrease in the durability of the wheel and the run-out accuracy of the wheel may be prevented.

Since the maximum H of the axial width of the side wall portion 33b of the spoke 33 may be within a range of two to twenty times the thickness of the bottom wall portion 33a of the spoke 33, a rigidity, a durability and a formability of the disk 30 may be ensured.

In the case where the shift portion 35a is provided between the vent window 34 and the disk flange 35, a rigidity of the disk flange 35 may be high and further, assembly of the disk 30 with the rim 20 may be easy.

Next, unique portions to each embodiment of the present technology will be explained.

First Embodiment

FIGS. 1-13

In the first embodiment of the present technology, the non-contact portion 36 may be constructed from a cut portion 36a located at the radially outer extension of the width center line of the spoke 33. The cut portion 36a may reach the bottom wall portion 33a of the spoke 33. Therefore, as illustrated in FIGS. 2 and 12, the non-contact portion 36 may be seen as a clearance in the front view of the wheel 10, 10a.

Preferably, a length of the cut portion 36a in the axial direction of the wheel at a deepest portion of the cut portion may be larger than the length of the disk flange 35 in the axial direction of the wheel. However, so long as the cut portion 36a reaches the bottom wall portion 33a of the spoke 33, the axial length of the cut portion 36a at the deepest portion of the cut portion may not be larger than the axial length of the disk flange 35.

Figure 5:
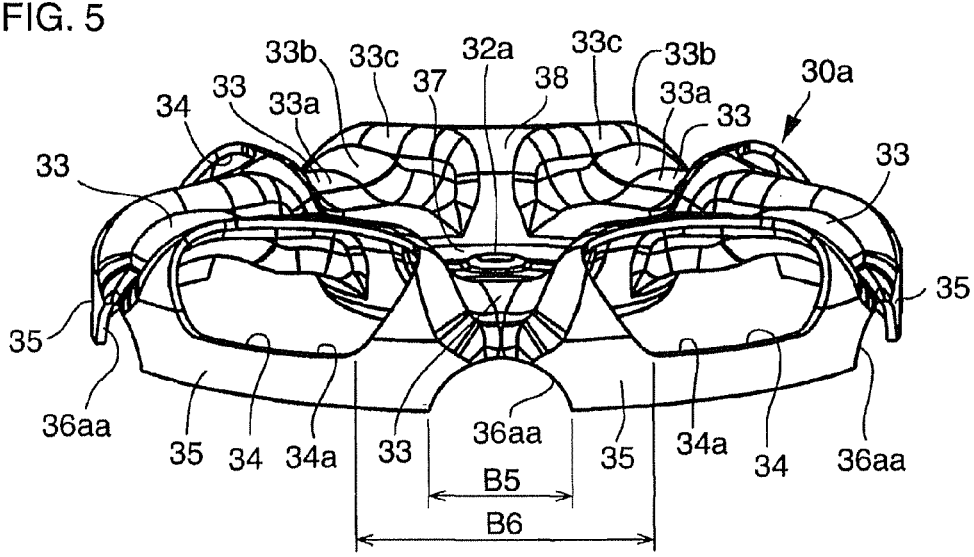
FIG. 5 is an oblique view of the vehicle wheel according to the first embodiments of the present technology where the non-contact portion is made from a substantially semicircular cut portion.
Figure 6:
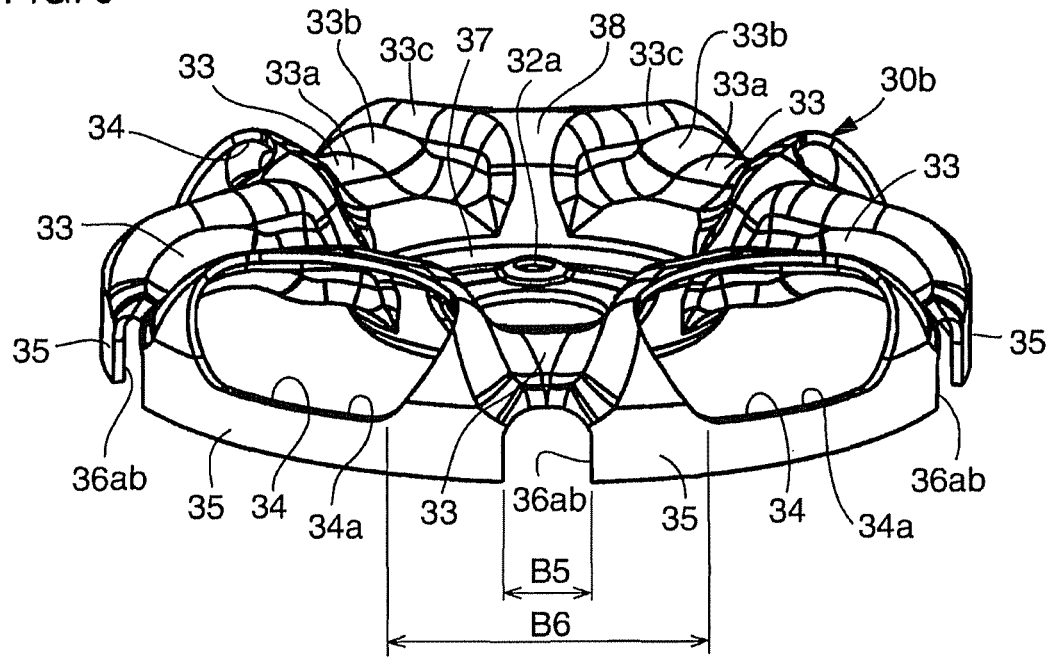
FIG. 6 is an oblique view of the vehicle wheel according to the first embodiments of the present technology where the non-contact portion is made from an elongated substantially semicircular cut portion.
Figure 7:
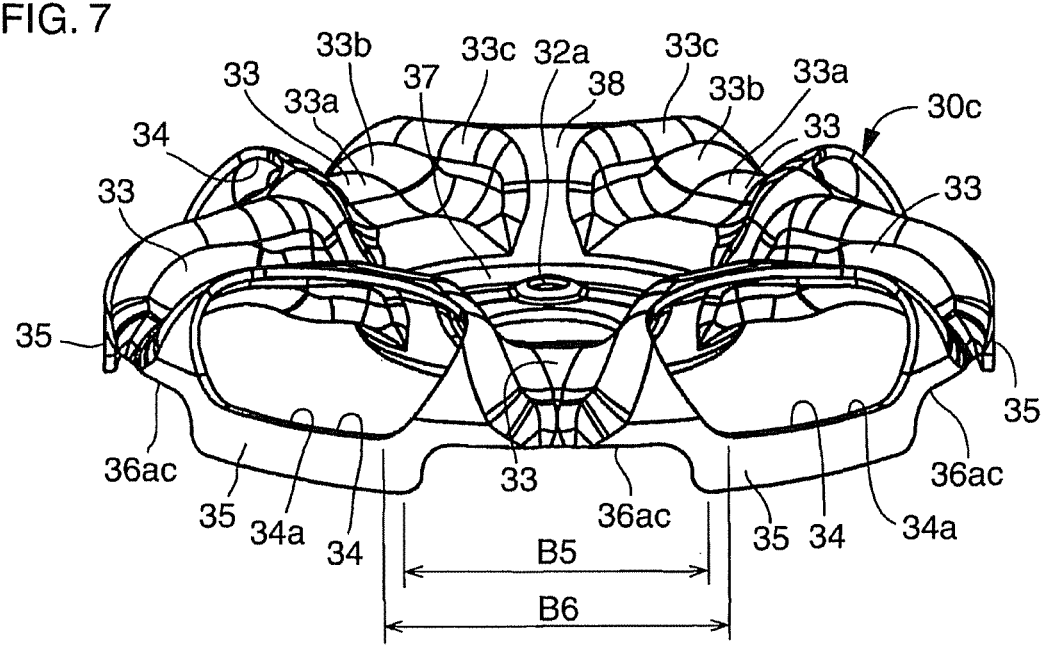
FIG. 7 is an oblique view of the vehicle wheel according to the first embodiments of the present technology where the non-contact portion is made from a substantially rectangular cut portion having a large width.

The shape of the cut portion 36a when viewed from a front side of the cut portion may be substantially rectangular as illustrated in FIG. 4, substantially semicircular (in a shape of a single arc) as illustrated with respect to cut portion 36aa in FIG. 5, elongated substantially semicircular (in a shape of a plurality of arcs and straight lines) as illustrated with respect to cut portion 36ab in FIG. 6, substantially rectangular as illustrated with respect to cut portion 36ac in FIG. 7 and having a larger width than the cut portion of FIG. 4, or of another shape. Preferably, a maximum width B5 of the cut portion 36a in the circumferential direction of the wheel may be larger than the thickness of the disk flange 35 and may be smaller than a width B6 of the spoke 33 in the circumferential direction of the wheel, of the portion of the disk flange where the spoke 33 is connected to the disk flange 35. More preferably, the maximum width B5 of the cut portion 36a in the circumferential direction of the wheel may be smaller than the width B1 in the circumferential direction of the wheel, of the smallest width portion of the spoke 33.

If the maximum width B5 of the cut portion 36a in the circumferential direction of the wheel is larger than above, a connection strength between the spoke 33 and the disk flange 35 may be decreased and the durability of the wheel may be decreased. If the maximum width B5 of the cut portion 36a in the circumferential direction of the wheel is smaller than above, a stress may be concentrated at the cut portion 36a and the durability of the wheel may decrease.

The cut portion 36a may be formed simultaneously when the hub hole 31, the hub bolt holes 32a and the vent windows 34 are formed, or may be formed after the disk 30 is formed. The cut portion 36a may be formed before the disk 30 is formed and is at a stage of a plate material. The largest width portion of the cut portion 36a in the circumferential direction of the wheel may be located at an axially inner end of the disk flange 35 (i.e., an open end of the cut portion 36a), or may be located at a portion axially spaced away in an axially outer direction from the axially inner end of the disk flange 35.

In addition to the aforementioned operations common to the first embodiment and the second embodiment of the present technology, the first embodiment of the present technology has further the following operations. The non-contact portion 36 may be formed by providing the cut portion 36a. Since the length of the cut portion 36a in the axial direction of the wheel may be larger than the length of the disk flange 35 in the axial direction of the wheel, or since the cut portion 36a may reach the bottom wall portion 33a of the spoke 33, the non-contact portion 36 may be made surely non-contact with the radially inner surface of the rim 20, by providing the cut portion 36a.

Further, by providing the cut portion 36a, in at least some examples the disk 30 (in turn, the wheel 10) may be made lighter than a disk having no cut portion.

Further, in the case where the cut portion 36a is formed at the same step as the step of forming the hub hole 31, etc., the cut portion 36a may be formed without providing a new step.

Second Embodiment

FIG. 16

In the second embodiment of the present technology, the non-contact portion 36 of disk 30h of wheel 10c may be constructed from a concave portion 36b concave from the radially inner surface of the rim 20 inwardly in the radial direction of the wheel and may be located at the radially outer extension of the width center line of the spoke 33. In the embodiment of FIG. 16, the concave portion 36b may be concave radially inwardly such that an outer surface and an inner surface of the disk flange 35 may be concave radially inwardly. The concave portion 36b may be formed concave radially inwardly by making a thickness of the disk flange 35 locally thin and making an outer surface of the thin portion concave radially inwardly.

Though not shown, the shape of the concave portion 36b when viewed from a front side of the concave portion 36b may be substantially rectangular, substantially semicircular (in a shape of a single arc), elongated substantially semicircular (in a shape of a plurality of arcs and straight lines), substantially rectangular and having a large width, or of another shape.

Preferably, a length of the concave portion 36b in the axial direction of the wheel at a deepest portion of the concave portion 36b may be larger than the length of the disk flange 35 in the axial direction of the wheel. However, so long as the concave portion 36b reaches the bottom wall portion 33a of the spoke 33, the axial length of the concave portion 36b at the deepest portion of the concave portion 36b may not be larger than the axial length of the disk flange 35.

The concave portion 36b may be formed simultaneously when the disk 30h is formed, or may be formed after the disk 30h is formed.

In addition to the aforementioned operations common to the first embodiment and the second embodiment of the present technology, the second embodiment of the present technology has further the following operations.

The non-contact portion 36 may be formed by providing the concave portion 36b.

In the case where the concave portion 36b is formed at the same step as the step of forming the disk 30h, the concave portion 36b may be formed without providing a new step.

From the foregoing, it will be appreciated that although specific embodiments have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A vehicle wheel comprising:
(a) a rim having a drop portion which is a smallest-diameter portion of the rim, and a radially inner surface; and
(b) a disk having a hub coupling portion, a plurality of spokes extending outwardly in a radial direction of the wheel from the hub coupling portion and a disk flange located at a radially outer end portion of the disk of the wheel and connecting radially outer end portions of the plurality of spokes along a circumferential direction of the wheel, the disk including a vent window formed between each pair of adjacent spokes of the plurality of spokes, the drop portion and the disk flange being connected to each other,
wherein the hub coupling portion has an axially inner surface in an axial direction of the wheel and the axially inner surface of the hub coupling portion is positioned between an axially outer end and an axially inner end of the disk flange in the axial direction of the wheel;
wherein the spoke has a bottom wall portion extending in the circumferential direction of the wheel, a pair of side wall portions each rising in the axial direction of the wheel from each of circumferentially opposite ends of the bottom wall portion and a brim portion extending in the circumferential direction of the wheel from each of the pair of side wall portions;
wherein each vent window is partially bounded by an axially outermost portion of the brim portion of a respective spoke;
wherein the disk flange has a non-contact portion non-contacting the radially inner surface of the rim, at a radially outer extension of a width center line of each of the plurality of spokes;
wherein the non-contact portion is constructed from a cut portion formed at the disk flange and located at the radially outer extension of the width center line of each of the plurality of spokes; and
wherein the cut portion has an open end positioned at a circumferential extension of the axially inner end of the disk flange in the axial direction of the wheel.

2. A vehicle wheel according to claim 1, wherein the cut portion reaches the bottom wall portion of the spoke.

3. A vehicle wheel according to claim 1, wherein the cut portion reaches the bottom wall portion, the side wall portion, and the brim portion of the spoke.

* * * * *